(12) United States Patent
Valentini

(10) Patent No.: US 7,799,104 B2
(45) Date of Patent: Sep. 21, 2010

(54) DUST COLLECTION CONTAINER WITH BLADED ELEMENT FOR POWER TOOL WITH SUCTION CAPACITY

(76) Inventor: Guido Valentini, Via Gioberti, 2, Milan (IT) 20123

( * ) Notice: Subject to any disclaimer, the term of this patent is extended or adjusted under 35 U.S.C. 154(b) by 457 days.

(21) Appl. No.: 11/790,286

(22) Filed: Apr. 24, 2007

(65) Prior Publication Data
US 2007/0251199 A1 Nov. 1, 2007

(30) Foreign Application Priority Data
Apr. 24, 2006 (IT) .......................... MI2006A0815

(51) Int. Cl.
*B01D 50/00* (2006.01)
(52) U.S. Cl. .................... 55/337; 55/399; 55/385.1; 55/498; 55/302; 55/447; 55/510; 55/462; 173/71; 173/73; 451/87; 451/270; 451/451; 451/456
(58) Field of Classification Search .................. 55/337, 55/339, 385.1, 498, 302, 447–451, 510, 399, 55/462–465; 173/71, 73; 451/87, 88, 270, 451/354, 357, 451, 453, 456
See application file for complete search history.

(56) References Cited

U.S. PATENT DOCUMENTS

| | | | | |
|---|---|---|---|---|
| 4,192,390 A * | 3/1980 | Wanner et al. | ................. | 173/75 |
| 4,381,628 A * | 5/1983 | Dicke | .......................... | 451/356 |
| 5,106,397 A * | 4/1992 | Jaroszczyk et al. | ............. | 96/388 |
| 5,113,951 A * | 5/1992 | Houben et al. | ................. | 173/75 |
| 5,419,737 A * | 5/1995 | Brazell et al. | ................ | 451/453 |
| 5,467,835 A * | 11/1995 | Obermeier et al. | ........... | 175/209 |
| 5,549,722 A * | 8/1996 | Zemaitis et al. | ................ | 55/463 |
| 5,690,545 A * | 11/1997 | Clowers et al. | .............. | 451/359 |
| 5,833,524 A * | 11/1998 | Satoh et al. | ................... | 451/456 |
| 5,941,765 A * | 8/1999 | Taylor | ......................... | 451/359 |
| 6,224,471 B1 * | 5/2001 | Clowers et al. | .............. | 451/359 |
| 6,514,131 B1 * | 2/2003 | Reich et al. | .................. | 451/344 |
| 6,641,634 B2 * | 11/2003 | Reich et al. | ................. | 55/385.1 |
| 6,827,640 B2 * | 12/2004 | Bures et al. | .................. | 451/456 |
| 6,833,023 B1 * | 12/2004 | Vandenberghe et al. | ........ | 95/268 |
| 6,848,985 B2 * | 2/2005 | Lamprecht et al. | ............ | 451/453 |
| 6,991,664 B2 * | 1/2006 | Riehmann et al. | .............. | 55/321 |
| 7,118,609 B2 * | 10/2006 | Valentini | .................... | 55/385.1 |
| 7,281,886 B2 * | 10/2007 | Stoerig | ......................... | 408/67 |
| 7,318,768 B2 * | 1/2008 | Deshpande et al. | ............. | 451/5 |
| 7,323,023 B2 * | 1/2008 | Michele et al. | ................ | 55/337 |
| 2004/0226272 A1 * | 11/2004 | Valentini | .................... | 55/385.1 |
| 2005/0037699 A1 * | 2/2005 | Park | ............................ | 451/344 |
| 2005/0245183 A1 * | 11/2005 | Deshpande et al. | .......... | 451/357 |

FOREIGN PATENT DOCUMENTS

GB 2343393 A 5/2000
IT MI2003A000961 5/2003

* cited by examiner

*Primary Examiner*—Jason M Greene
*Assistant Examiner*—Dung Bui
(74) *Attorney, Agent, or Firm*—Jacobson Holman PLLC

(57) ABSTRACT

A dust collection container for power tool with suction capacity is described comprising a first pipe (15) for air inlet and at least one second pipe (20) for air outlet, i.e. connected to the external environment, the dust container (13) comprising a filtering element (22) placed inside an external casing (14). The container further comprising a bladed element (100) accommodated in the external casing (14) and being adapted to increase the air turbulence. The shape of the space comprised between the filtering element (22) and the external casing (14) determines a cyclonic type air motion.

14 Claims, 4 Drawing Sheets

DUST COLLECTION CONTAINER WITH BLADED ELEMENT FOR POWER TOOL WITH SUCTION CAPACITY

The present invention relates to a dust collection container with bladed element for power tool with suction capacity.

There are known power tools, such as polishing machines, grinding machines and so on, in which a grinding wheel, usually called "pad", is orbited around the axis of a suitably controlled drive shaft.

A common problem in tools of that type is represented by the elimination of machining dusts, most of which are aspirated through a pipe which conveys them outwards.

Tools having a suction system directly incorporated within the tool itself are known, in which the machining dust is conveyed into a specific air filtering bag placed outside the tool. Such bags are removable from the apparatus for their replacement and/or cleaning.

Patent application GB 2 343 393 describes a tool comprising a dust extraction system arranged inside its container which conveys the dust into a dust collection container. The dust collection container has holes for releasing the air from the top of the container, transversally with respect to the direction of the air flow from the tool. A filter is placed on the top of the container at the holes. Once saturated, the filter is replaced.

Patent MI2003A000961 by the applicant describes a power tool with suction and dust collection capacity, comprising a dust collection container consisting of an external cylindrical casing with an air inlet pipe and an air outlet pipe.

A cylindrical filter which purifies the dusty air withholding the machining particles is accommodated within said container.

A problem of the latter collection system is the durability of the filtering element which must be frequently replaced.

It is the object of the present invention to provide a dust collection system which is more efficient than those known, the dimensions of the filtering element and of the casing which contains it being equal.

In accordance with the invention, such object is reached by means of a dust collection container for power tool with suction capacity comprising a first pipe for air inlet, and at least one second pipe for air outlet, i.e. connected to the outside environment, said dust container comprising a filtering element placed inside an external casing, characterised in that it further comprises a bladed element accommodated in said external casing and adapted to increase the air turbulence.

The bladed element allows to increase the turbulence of the dusty air improving the deposit of the largest particles in the external casing before the filtering action.

The filtering element is consequently not required to withhold said larger particles, the durability of the same being thus increased.

The features of the present invention will be further explained in the following detailed description of a practical embodiment thereof, shown by way of non-limitative example in the accompanying drawings, in which.

Figure 1:
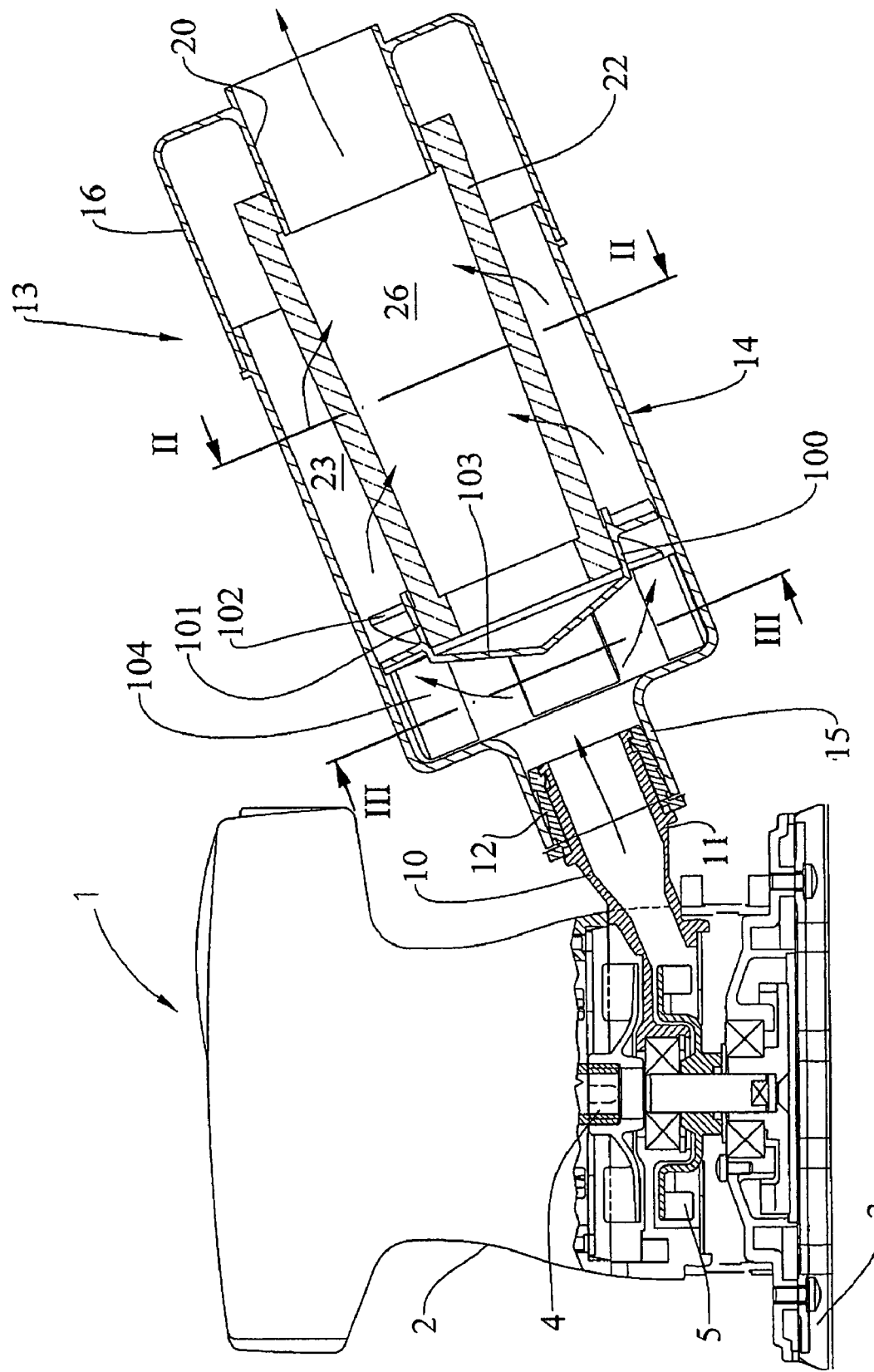
FIG. 1 shows a side section view of a first embodiment of the tool and of the dust collection container according to the present invention.
Figure 2:
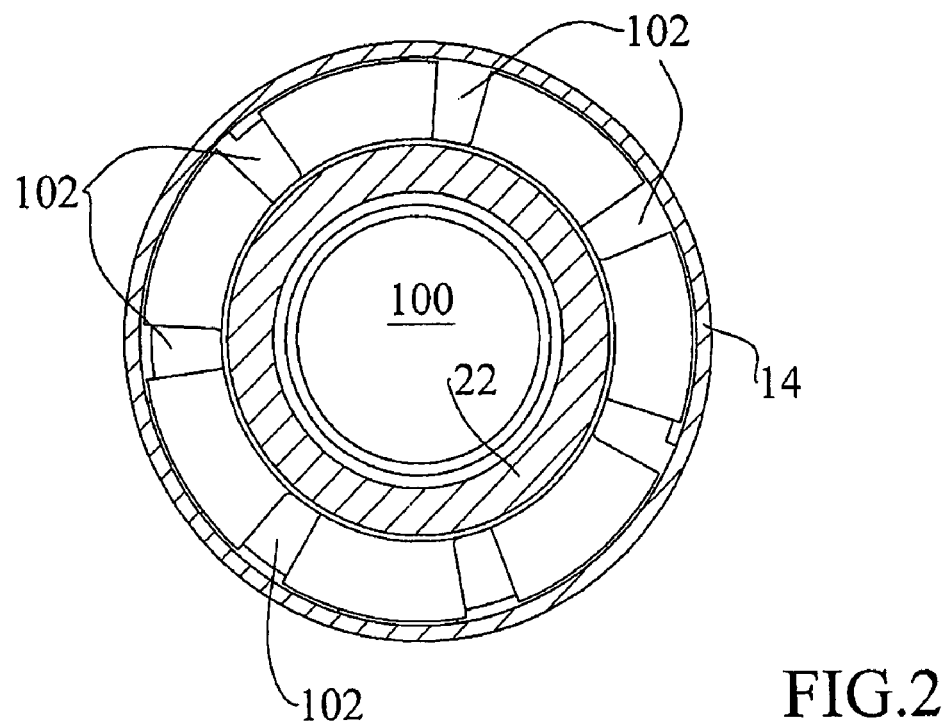
FIG. 2 shows a magnified section view taken along line II-II in FIG. 1.
Figure 3:
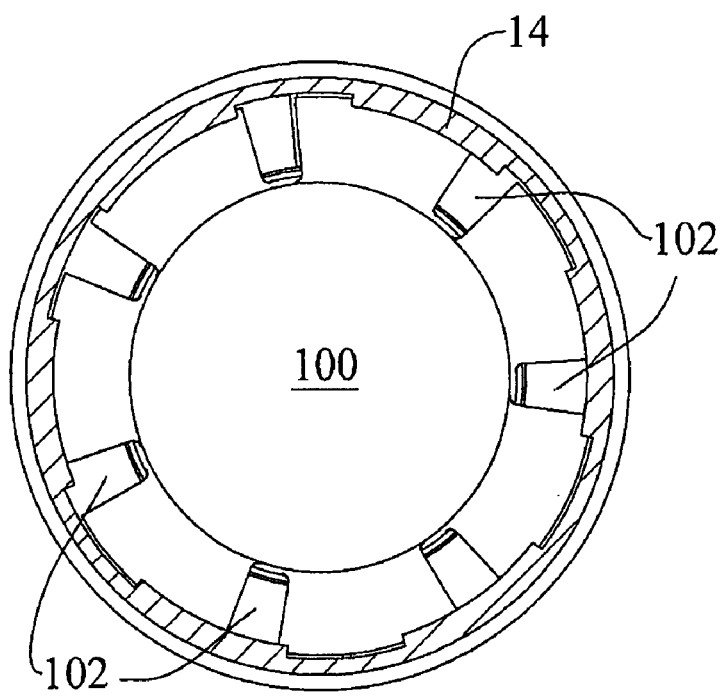
FIG. 3 shows a magnified section view taken along line III-III in FIG. 1.

The tool shown in FIG. 1 is an exemplary orbital grinding machine comprising a machining head 1.

Machining head 1 comprises an external rigid armature 2, in which there is accommodated an actuating mechanism assembly for a grinding wheel or pad 3 (or alternatively a plate of either rectangular or triangular shape).

In turn, the actuating mechanisms comprise a drive shaft 4 which operates a fan 5 which has the task of aspirating the machining dust and sending it to a connection tube 10. Connection tube 10 puts the inside of machining head 1 into communication with the outside environment. Connection tube 10 ends with a mouth 11 preferably provided with a seal 12.

A dust collection container 13 may be connected to mouth 11. It preferably consists of a cylindrical container or external casing 14 having an inlet pipe 15 placed at one of its ends for connecting to mouth 11.

A removable dust collecting closing element 16 is placed on the other end of container 13.

A vertical truncated-cone section filtering cartridge 22 (FIG. 1) formed by filtering material is placed inside container 13.

Figure 4:
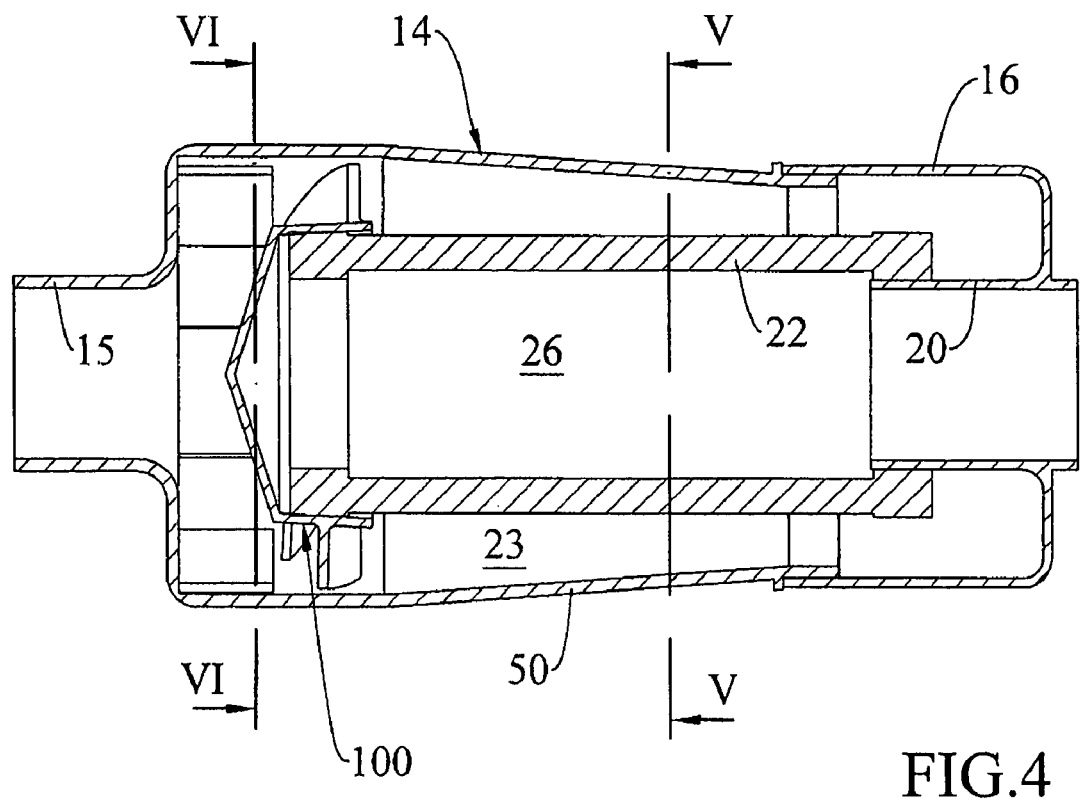
FIG. 4 shows a section view of a second embodiment of the dust collection container according to the present invention.
Figures 5, 6:
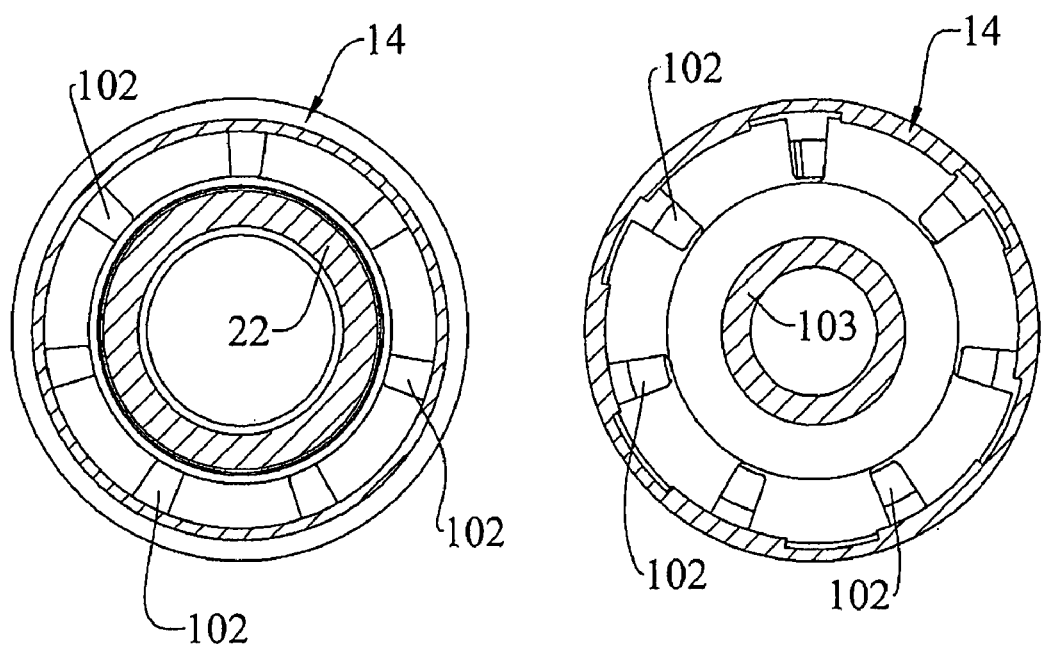
FIG. 5 shows a section view taken along line V-V in FIG. 4.
FIG. 6 shows a section view taken along line VI-VI in FIG. 4.

Filtering cartridge 22 may also be cylindrical with truncated-cone container 14 or at least have a truncated-cone-shaped portion 50 (FIG. 4-6).

For its entire length, filtering cartridge 22 has a smaller radius than the radius of container 13, and container 13 is provided so that cartridge 22 creates a external space 23 between the external surface of cartridge 22 and the internal surface of cylindrical container 14.

Inside cartridge 22 there is a space 26 in which the purified air which is released through an outlet pipe 20 flows.

Cartridge 22, on the side of inlet pipe 15, is in contrast with a cylindrical portion 101 of a bladed element 100 further comprising a conical head portion 103 and peripheral blades 102.

A head chamber 104 is made between head portion 103 and filler pipe 15.

On the other side, cartridge 22 is in contrast with closing element 16.

In the present embodiment, bladed element 100 is separate both from cartridge 22 and from cylindrical container 14. However, said bladed element 100 may be integrally made with cartridge 22 or cylindrical container 14.

Dust collection container 13 is self-supporting and sealed except for pipe 15 and pipe 20.

Regarding operation, when tool 1 is running, fan 5 also turns and generates a flow of air which collects the machining dust and conveys it through connection tube 10 towards container 13.

The air to be purified enters into container 13 through inlet pipe 15 reaching head chamber 104.

Head portion 103 conveys the air towards the periphery of container 13, where blades 102 are placed.

Bladed element 100 is mounted so that the air must interact with blades 102 in order to reach external space 23.

In this way, the turbulence of the air to be purified is increased, more specifically there is created a vortex of cyclonic air due to the configuration of external space 23 in virtue of the truncated-cone shape of cartridge 22 and the cylindrical shape of container 14 (or vice versa).

Consequently, the largest dust particles reach the end part of container 13, i.e. removable closing element 16, more easily and are deposited here.

The air flow induced by fan 5 thus determines the passage of air to be purified through cartridge 22 and thus the release of purified air through pipe 20 (see arrows in FIG. 1).

The work of cartridge 22 is however lower than in the known systems, because the air to be purified was previously deprived of the largest particles which will later be removed by removing closing element 16.

Consequently, dimensions of cartridge 22 and container 13 being equal, the durability of cartridge 22 itself is increased and its replacement remains easy because it is sufficient to remove closing element 16.

Container 13 is described as having a circular shape but may be of any other shape, for example a parallelepiped shape. The same applies to filtering cartridge 22.

Figure 7:
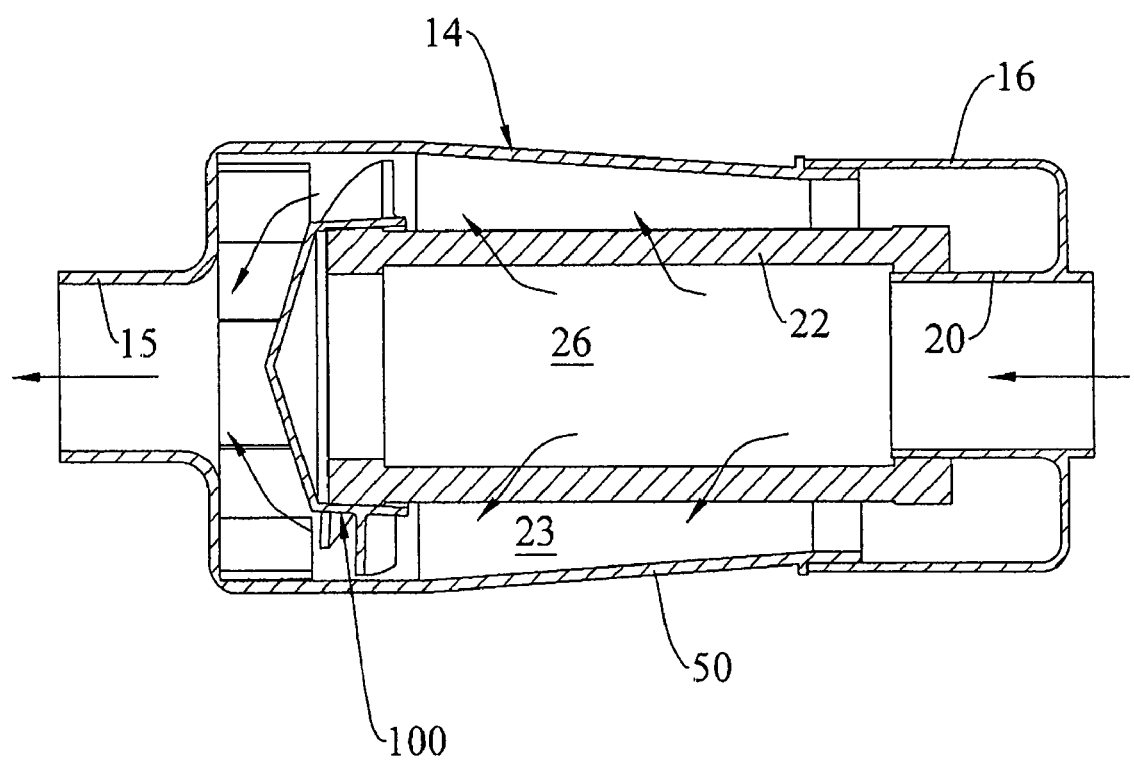
FIG. 7 shows a similar view to that in FIG. 4 showing the filtering element regeneration air flow.

The filter may be regenerated by removing container 13 from tool 1 and connecting inlet pipe 15 to an external suction means. FIG. 7 shows the reverse air flow which is created, i.e. the clean air enters from pipe 20, crosses cartridge 22 thus cleaning it, and is released through pipe 15 drawn by the external suction means (not shown).

The invention claimed is:

1. A dust collection container for power tool with suction capacity, comprising a first pipe for air inlet into a head chamber, and at least one second pipe for air outlet connected to the outside environment, said dust container comprising a filtering element placed inside an external casing, and a bladed element accommodated in said external casing, said filtering element delimiting an internal space communicating with said second pipe and an external space communicating with said head chamber through the bladed element surrounding said internal space, characterized in that:

said bladed element is provided with a cylindrical portion containing the head of the filtering element and outwardly supporting a plurality of peripheral blades radially extending from the external surface of the filtering element to the internal surface of the external casing at the inlet of said external space.

2. The container according to claim 1, characterized in that said peripheral blades have diverting surfaces inclined with respect to the filtering element and the external casing.

3. The container according to claim 1, characterized in that said bladed element comprises an air conveying conical head portion mounted on the head of the filtering element.

4. The container according to claim 1, characterized in that the container comprises a head chamber upstream of the bladed element.

5. The container according to claim 1, characterized in that said external casing comprises a removable dust accumulation closing element.

6. The container according to claim 1, characterized in that said filtering element is truncated-cone-shaped.

7. The container according to claim 1, characterized in that said filtering element is cylindrical-shaped.

8. The container according to claim 1, characterized in that said external casing is cylindrical-shaped.

9. The container according to claim 1, characterized in that said external casing has at least one truncated-cone-shaped portion.

10. The container according to claim 1, characterized in that the external surface of filtering element is inclined with respect to the internal surface of the external casing, said conformation causing a cyclonic motion of the air after the same has interacted with the bladed element.

11. The container according to claim 1, characterized in that said filtering element is removably couplable with the bladed element.

12. The container according to claim 1, characterized in that said bladed element is removably couplable with the external casing.

13. The container according to claim 1, characterized in that said bladed element is integrally made with the external casing.

14. The container according to claim 1, characterized in that said bladed element is integrally made with the filtering element.

* * * * *